United States Patent [19]

Kaplan et al.

[11] Patent Number: 5,737,621
[45] Date of Patent: Apr. 7, 1998

[54] FINITE-STATE ENCODING SYSTEM FOR HYPHENATION RULES

[75] Inventors: Ronald M. Kaplan, Palo Alto; Lauri J. Karttunen, Redwood City, both of Calif.

[73] Assignee: Xerox Corporation, Rochester, N.Y.

[21] Appl. No.: 469,173

[22] Filed: Jun. 6, 1995

Related U.S. Application Data

[63] Continuation of Ser. No. 51,024, Apr. 21, 1993, abandoned.
[51] Int. Cl.$^6$ .................................................. G06F 17/20
[52] U.S. Cl. ........................ 395/793; 707/521; 707/529
[58] Field of Search ................... 364/419.06, 419.08, 364/419.1, 419.11, 419.12, 419.17; 395/2.69, 2.75, 425, 761, 779, 780, 781, 783, 787, 792, 793, 794, 795; 404/1, 3, 4, 7; 707/521, 529, 531

[56] References Cited

U.S. PATENT DOCUMENTS

| | | | |
|---|---|---|---|
| 3,439,341 | 4/1969 | Dolby et al. | 400/7 |
| 3,537,076 | 10/1970 | Damerau | 395/793 |
| 4,028,677 | 6/1977 | Rosenbaum | 395/793 |
| 4,092,729 | 5/1978 | Rosenbaum et al. | 395/795 |
| 4,181,972 | 1/1980 | Casey | 395/793 |
| 4,241,402 | 12/1980 | Mayper, Jr. et al. | 395/606 |
| 4,285,049 | 8/1981 | Bird et al. | 395/483 |
| 4,450,520 | 5/1984 | Hollaar et al. | 395/550 |
| 4,574,363 | 3/1986 | Carlgren et al. | 395/793 |
| 4,783,811 | 11/1988 | Fisher et al. | 395/2.75 |
| 4,811,400 | 3/1989 | Fisher | 395/2.69 |
| 5,450,598 | 9/1995 | Kaplan et al. | 395/800 |
| 5,553,283 | 9/1996 | Kaplan et al. | 395/612 |
| 5,560,037 | 9/1996 | Kaplan | 395/800 |

OTHER PUBLICATIONS

Wortman et al.; *The C Programming Tutor*; Robert J. Brady Co.; copyright 1984; pp. 109–122.
Liang; "Word Hyphenation by Computer"; *Stanford University*; Jun. 1983; pp. 1–85.
Karttunen, Lauri; "Finite-State Constraints," International Conference on Current Issues in Computational Linguistics, Jun. 10–14, 1991, Penang, Malaysia, pp. 1–18.
Rabiner, Lawrence A.; "A Tutorial on Hidden Markov Models and Selected Applications in Speech Recognition," *Proceedings of the IEEE*, vol. 7, No. 2 Feb., 1989, pp. 257–285.
Rabiner, Lawrence A., Juang, B.H.; "An Introduction to Hidden Markov Models," *IEEE ASSP Magazine*, Jan., 1986, pp. 4–16.
Lucchesi, Claudio L., Kowaltowski, Tomasz; "Applications of Finite Automata Representing Large Vocabularies," *Software Practice and Experience*, vol. 23(I), 15–30 (Jan., 1993), pp. 15–30.

*Primary Examiner*—Gail O. Hayes
*Assistant Examiner*—Stephen R. Tkacs
*Attorney, Agent, or Firm*—Phillip H. Albert; Townsend and Townsend and Crew LLP

[57] ABSTRACT

Valid positions for hyphens in input strings are determined by reading in and processing the symbols of the input string through a finite state transducer which has a state-transition data structure determined by a compilation of a set of hyphenation rules. The output of the encoding system can include a hyphenated string, or can accept a hyphenated string and output an indication of whether the input hyphenation is proper according to the set of hyphenation rules.

19 Claims, 3 Drawing Sheets

FINITE-STATE ENCODING SYSTEM FOR HYPHENATION RULES

This is a Continuation of application Ser. No. 08/051,024 filed Apr. 21, 1993 now abandoned.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

This application relates to U.S. Pat. No. 5,560,037, issued Sep. 24, 1996, entitled "Compact Hyphenation Point Data", U.S. Pat. No. 5,553,283, issued Sep. 3, 1996, entitled "Stored Mapping Data with Information for Skipping Branches While Keeping Count of Suffix Endings", and U.S. Pat. No. 5,450,598, issued Sep. 12, 1995, entitled "Finite State Machine Data Storage Where Data Transition is Accomplished Without the Use of Pointers", each of which are incorporated herein by reference for all purposes.

BACKGROUND OF THE INVENTION

The present invention relates to the field of finite state machines (FSMs) and finite state transducers (FSTs). More specifically, the invention relates to finite state transducer systems for generating hyphenated strings from unhyphenated strings of characters and for testing a hyphenated string for proper hyphenation.

U.S. Pat. No. 5,560,037 describes the use of FSTs to hyphenate words according to a list of hyphenations for words. Therein, a directed graph is shown which indicates the operation of a hyphenation FST.

Externally, an FSM can be thought of as a machine which reads an input tape containing a string of symbols, and determines whether or not the string is in a set of strings accepted by the FSM. For example, the set of strings might be the words in a dictionary, in which case the input string might be a word to be checked for proper spelling, the input symbols would be the letters of the alphabet (possibly including intraword punctuation), and the FSM would accept each of the words in the dictionary. The words of the dictionary are typically encoded into a data structure which defines the operation of the FSM. A process for transforming a list of words into such an FSM data structure is described in U.S. Pat. No. 5,560,037 and U.S. Pat. No. 5,450,598.

Because the FSM is a finite state machine, its operation can be described by a finite number of states, one of which is an initial state, and the data structure describing the transitions from a current state to a next state, and indicating which of the states are final states. The operation of the FSM is often shown by a directed graph, which comprises states shown as circles, the transitions as arcs with arrowheads indicating the direction of transition, and the tape symbols leading to those transitions labelling the transition arcs. The initial state is either labelled 0 or 1 by convention, and the final states are indicated by a circle within a circle. The tape symbol is usually, but not necessarily a letter or punctuation character in the input string being read.

The operation of the FSM can then be described with reference to the directed graph, as a machine which starts with a current state equal to the initial state, reads the first symbol of the input string, moves from the initial state to a new state if possible, using a transition which includes the first symbol in its label. The FSM then moves to the next symbol in the input string, and repeats the process for each subsequent symbol in the input string. After reading the entire string, if the FSM is in a final state, the input string is said to be in the set of strings accepted by the FSM, otherwise it is not. Since the input string is read one symbol at a time, the input string could be thought of as a tape fed into the FSM. In a deterministic FSM, from each state there exists at most one transition for a given input symbol. In a non-deterministic FSM, some states may have more than one transition for a given input symbol. Also, in some FSMs, a null character can be read from the input string. In effect, a transition is taken, but without the input tape advancing; this is designated by the label "φ".

A finite state transducer (FST) is similar to an FSM, except that the FST accepts or rejects pairs of strings. For reasons that will become apparent, these are often called the input tape or string, and the output tape or string. The FST can also be described by a directed graph, but one where each transition is labelled by an input symbol and an output symbol pair.

Some uses of FSTs are discussed in L. Karttunen, *Finite-State Constraints*, International Conference on Current Issues in Computational Linguistics, Jun. 10–14, 1991. An FST can be used to implement a set of rules which specify a set of input-output string pairs which are to be accepted. These pairs might be the singular and plural forms of words paired together, for example.

The FST described in U.S. Pat. No. 5,560,037 is used to determine hyphenation points for words and the correctness of hyphens in a hyphenated word. In the terminology used above, the input string is the word to be checked, and the output string is the word with imbedded hyphens at proper hyphenation points. The set of string pairs accepted are a set of string pairs each comprising a base word and a hyphenated word.

In one application, a word with hyphens inserted is checked by the FST. The input tape is the word without hyphens and the output tape is the word with hyphens. If the FST is encoded to accept that word and that particular hyphenation of the word, it is accepted. In another application, a word is input to the FST, and the FST indicates an output string which is the word with hyphenation points indicated by hyphens. If more than one hyphenation is acceptable, more than one output string is indicated.

One example of a FST will be described along with FIG. 1. FIG. 1 is a directed graph 100 representing the states and the transitions of a hyphenation FST. In directed graph 100, each transition from a state to another state is indicated by a directional arc, and is labelled by the input-output symbol pairs which would cause the transition. For example, if the FST is in state 1, and the input symbol and output symbols are both "D", the transition to state 2 is taken. In an FST, the transition labels are symbol pairs, written as an input symbol, a colon, and an output symbol (i.e., "D:D"). In a shorthand notation, if the input and the output symbol are the same, the label is shown as the single symbol, such as the transition labelled "R" between states 2 and 3. The label "D:D" might have been shortened to "D", but was left in the full notation for illustration. Although it is not required of an FST, directed graph 100 indicates that most of the symbol pairs match a character in the input string to the same character in the output string. This is generally expected in a hyphenation FST, since the letters of a word do not change when the word is hyphenated.

For some symbols and some states, no transition exists, such as the FST using directed graph 100, which has no transition from state 1 other than the symbol "D". Thus, any word not beginning with "D" is not accepted by the FST. Table 1 indicates the input-output pairs accepted by the FST represented by directed graph 100.

TABLE 1

| (input string, output string) | |
|---|---|
| dip, | dip |
| dipped, | dip-ped |
| dipper, | dip-per |
| dipping, | dip-ping |
| dips, | dips |
| drip, | drip |
| dripped, | drip-ped |
| dripper, | drip-per |
| dripping, | drip-ping |
| drips, | drips |
| drop, | drop |
| dropped, | drop-ped |
| dropper, | drop-per |
| dropping, | drop-ping |
| drops, | drops |

Because of the placement of the final states and transitions, only the above pairs are accepted by the FST. In FIG. 1, as mentioned above, The null symbol "φ" as in the transition labelled "φ:–" indicates that the null symbol is read from the input string and the "–" is read from the output string. A null symbol is equivalent to not reading a symbol and not advancing the tape.

There are two ways the FST can be used. In one application, the output string is known, and the input and output string are read one symbol at a time, advancing the input and output tapes (except when a null symbol is read), and taking any transitions allowed. In another application, the output string is not known, and the input string is read in, and the output symbols encountered along the path of transitions taken is output.

As should be apparent from the directed graph shown in FIG. 1, the hyphenation FST will only provide a hyphenated output string for the finite list of words in the input column of Table 1. Although the pair (hello, hell-o) might indicate a valid hyphenation, if would not be a pair accepted by the FST, as the FST would be blocked at state 1 since the only valid transition is D:D. Since no path through directed graph 100 from the initial state to a final state is possible for an input string beginning with "h", the pair (hello, hell-o) is rejected by the FST.

Although the small list of Table 1 is not useful for a practical hyphenation engine, a much larger list of words could be encoded into a state-transition structure of an FST. However, even an FST accepting a large number of words and hyphenation pairs would not be acceptable in an application requiring a hyphenation engine which hyphenates English words, such as would be incorporated into a word processor, as several problems would occur with encoding the FSM structure. First, there is no exhaustive and definitive list of valid words, and new words are created daily. Second, for applications in other languages, such as German or Finnish, where words are created by users through concatenation of base words, the word list is potentially infinite and not known in advance.

What is needed is a means for encoding a potentially infinite list of words, which are not necessarily known in advance, into an FST structure for hyphenation checking and hyphenation generation.

SUMMARY OF THE INVENTION

An improved hyphenation FST is provided by virtue of the present invention.

In one embodiment of a hyphenation FST according to the present invention, a word is input to an FST with a state-transition diagram encoding hyphenation rules for an unbounded set of words, and the FST indicates positions of allowed hyphens. The state-transition structure of the FST represents a set of hyphenation rules which includes rules applicable to an unbounded set of words, and rules applicable to a finite set of one or more words. The FSM state transition structure is compiled or generated from the set of hyphenation rules indicating where hyphens would go in a substring. The data structure can be compiled manually or automatically, such as with the aid of a programmed digital computer. Once a set of hyphenation rules is converted into a directed graph, the directed graph can be accessed in a compact encoded form, as taught in pending U.S. Pat. No. 4,450,598. The compact encoded form provides one means to encode large numbers of rules embodied in states and transitions therebetween. However, the compact encoded form is not necessary to the present invention, as any means of storing states and transitions of the directed graph will work with the present invention.

Because the hyphenation rules can apply to infinitely many strings, the corresponding FST will have looping paths of state transitions.

In one embodiment of a hyphenation FSM according to the present invention, the directed graph is stored in a memory as machine-readable state and transition data, and a string processor applies an input string to the state and transition data. The result of the application of the input string is either an output string reflecting the input string and allowable hyphen points or an indicator of whether hyphens in the input string are correctly placed.

A further understanding of the nature and advantages of the inventions herein may be realized by reference to the remaining portions of the specification and the attached drawings.

·DESCRIPTION OF THE PREFERRED EMBODIMENTS

Figure 2:
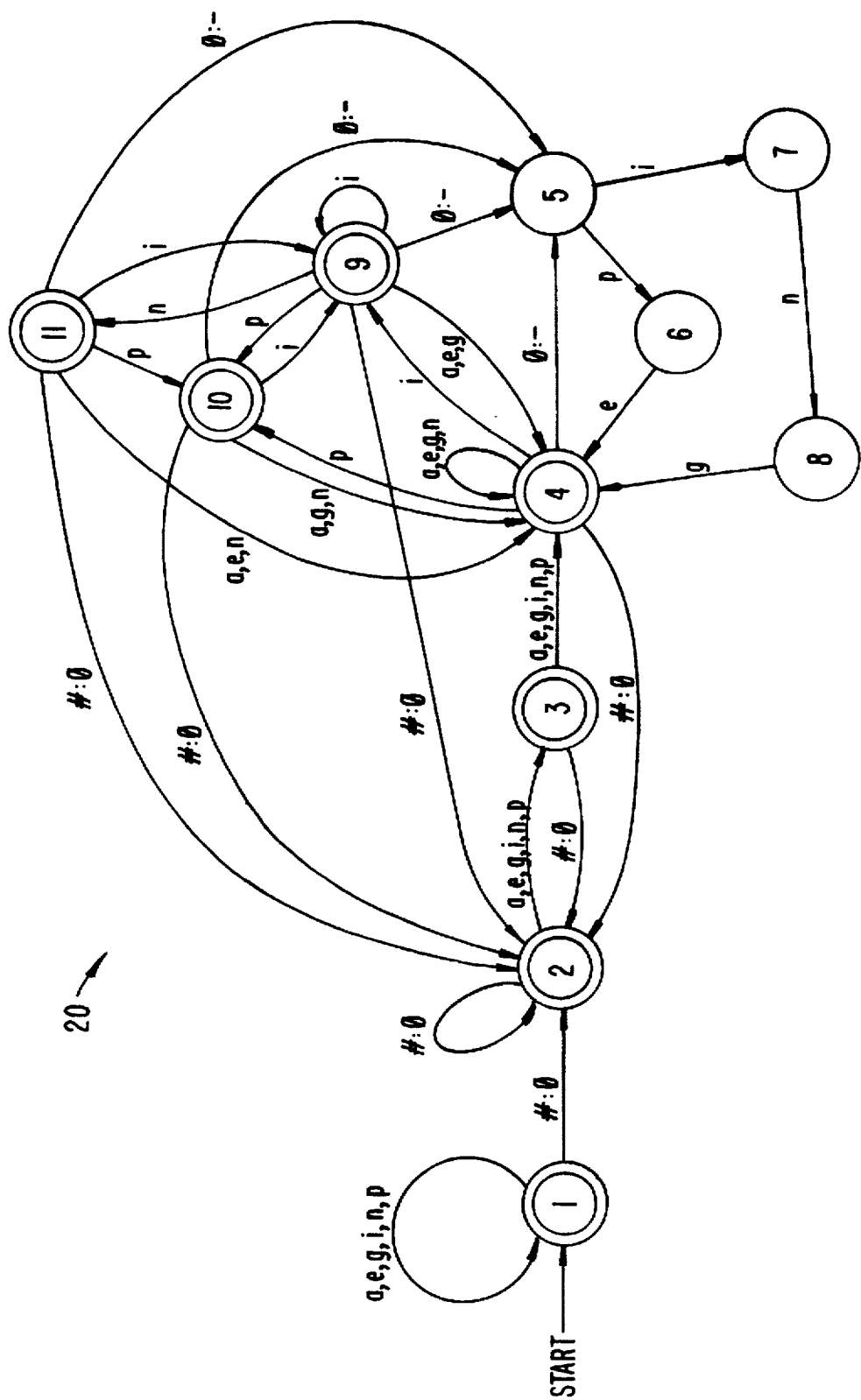
FIG. 2 is a directed graph of a hyphenation FST representing a set of hyphenation rules and encoding for an infinite set of words.
Figure 3:
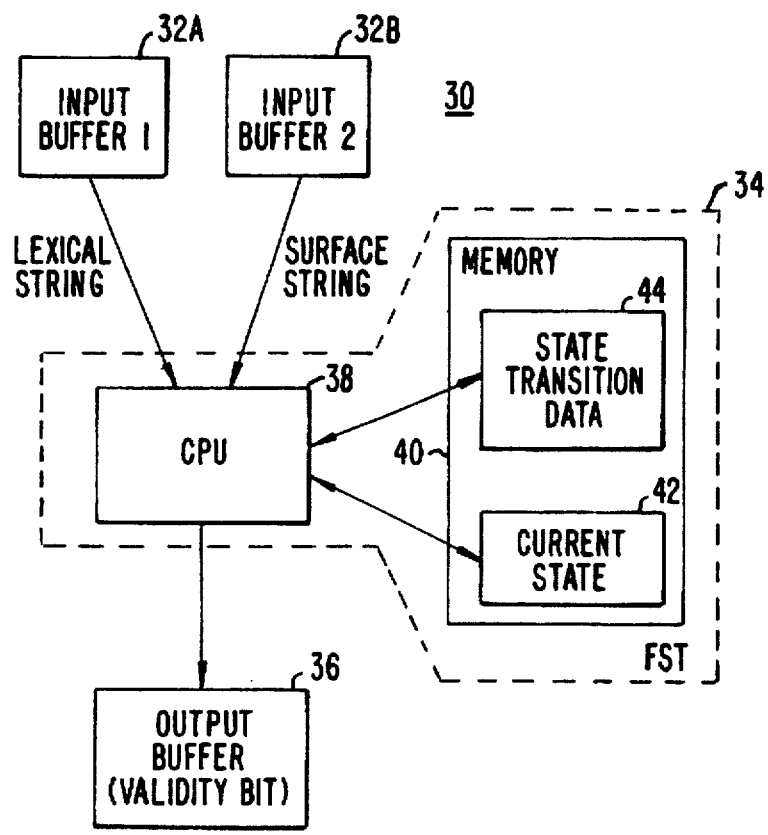
FIG. 3 is a block diagram of a string processor which processes input strings according to the directed graph of FIG. 2 to check a hyphenated word for proper hyphenation.

FIG. 2 illustrates a directed graph 20 of a hyphenation FST (see FIG. 3). Directed graph 20 encodes for an arbitrary rule of hyphen placement, selected for this example: hyphens are placed in strings before the substring "PE" and before the substring "ING", but not if the hyphen would be before the first two characters. Formally speaking, the FST accepts all input-output string pairs in which the output string is the same as the input string, except for hyphens added in the output string in allowed positions. Table 2 shows the formal expression of the rule of hyphen placement.

TABLE 2

ALPHABET
a b c d e f g h i j k l m n o p q r s t u v w x y z %- φ:%- ;
SETS
Ltr= a b c d e f g h i j k l m n o p g r s t u v w x y z %- ;
RULES
"Rule 1"   ! Place a hyphen before the substring "PE"
           ! but not between the first characters.
φ:%- <=>   #: [Ltr Ltr*]/0: Ltr _ p e/0: ;
"Rule 2"   ! Place a hyphen before the substring "ING"
           ! but not between the first two characters.
φ:%- <=>   #: [Ltr Ltr*]/0: Ltr _i |n g]/0: ;

This formal expression of rules is used by the Two-level Rule Compiler, created by the Xerox Corporation. The ALPHABET section lists the input:output symbol pairs used in the FST. The first symbol pair in the alphabet is "a:a", which is shortened to "a". This symbol pair indicates an input symbol of "a" and an out symbol of "a". The last pair, "φ:%–", is the symbol pair of a null input symbol and a hyphen output character (the "%" is used to indicate that the "–" is not a control character).

The SET section lists the components of the set Ltr, which is used to compactly refer to all the members of the set Ltr (these are also symbol pairs). The RULES section lists the rules themselves, with the rule names in double quotes and comments preceded by exclamation points.

Figure 1:
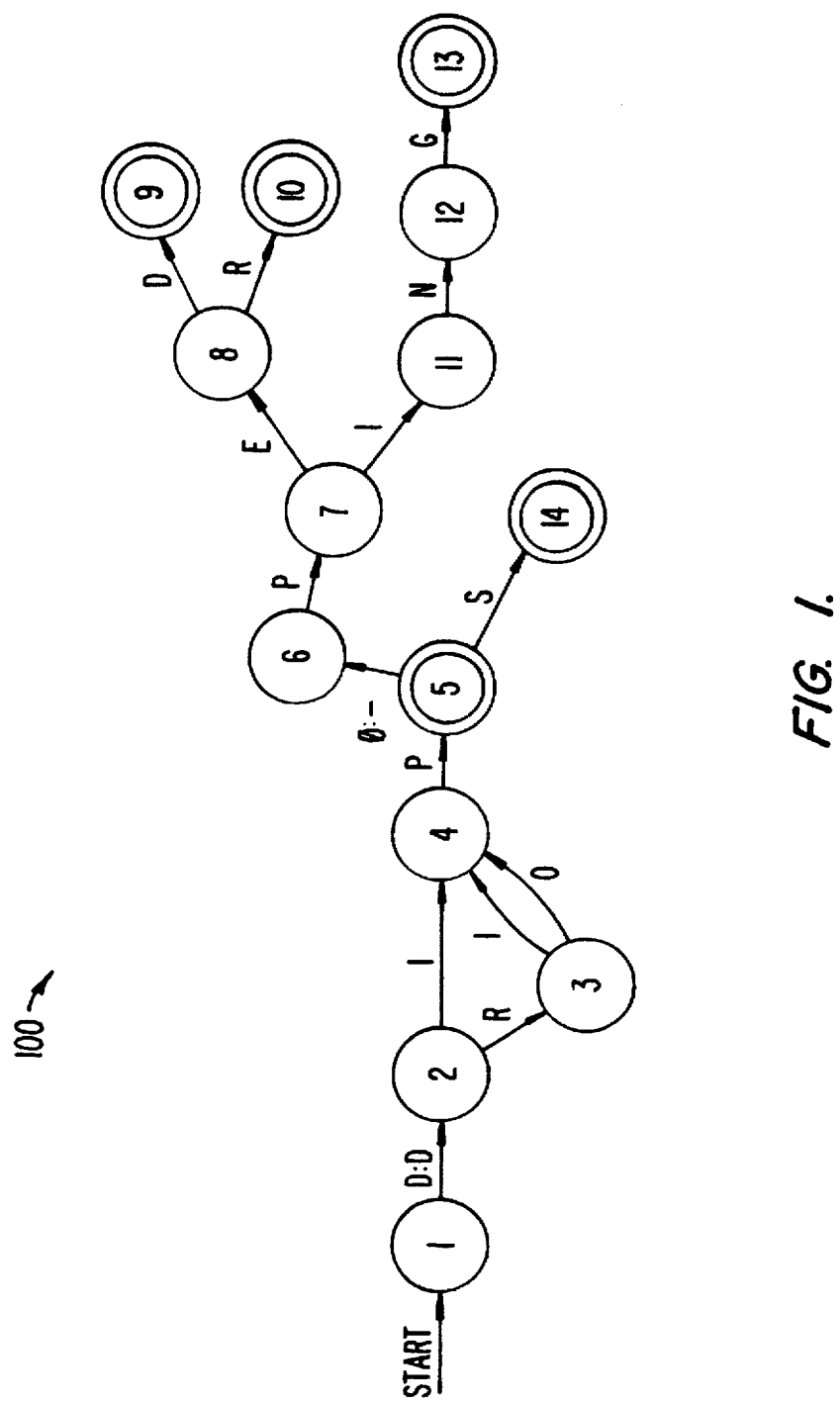
FIG. 1 is a directed graph of a hyphenation FST encoding for a finite set of words.

The rules do not reflect proper hyphenation rules for the English language, but were selected for clarity of example and also to illustrate that the present invention is applicable to any set of arbitrary hyphenation rules, not just those of English or other languages. For example, Rule 2 is not the proper rule for "ing" endings in English. While directed graph 100 (see FIG. 1) encodes "ing" endings properly, it does so for only three words: dipping, dripping, and dropping. As will be apparent from the example, directed graph 20 encodes for a potentially infinite set of input strings. An input string to an FST using directed graph 20 need not even be a valid word in any language, as later examples will show. A rule-based hyphenation FST is particularly useful in languages such as Finnish or German, where long words are created by concatenating base words together. With a rule-based system, only the rules for the base words need be encoded, as opposed to a word-list oriented FST which requires prior specification of all the different ways to combine the base words.

Table 3 shows a state-transition data structure generated by the two-level rule compiler, which is an alternate expression of directed graph 20.

TABLE 3

State Transitions for the Intersection of Rule 1 and Rule 2

|     | a | e | g | i | n | p | #:φ | φ:- |
|-----|---|---|---|---|---|---|-----|-----|
| 1:  | 1 | 1 | 1 | 1 | 1 | 1 | 2   |     |
| 2:  | 3 | 3 | 3 | 3 | 3 | 3 | 2   |     |
| 3:  | 4 | 4 | 4 | 4 | 4 | 4 | 2   |     |
| 4:  | 4 | 4 | 4 | 9 | 4 | 10| 2   | 5   |
| 5.  |   |   |   | 7 |   | 6 |     |     |
| 6.  |   | 4 |   |   |   |   |     |     |
| 7.  |   |   |   |   |   | 8 |     |     |

TABLE 3-continued

State Transitions for the Intersection of Rule 1 and Rule 2

|     | a | e | g | i | n | p | #:φ | φ:- |
|-----|---|---|---|---|---|---|-----|-----|
| 8.  |   |   |   | 4 |   |   |     |     |
| 9:  | 4 | 4 | 4 | 9 | 11| 10| 2   | 5   |
| 10: | 4 |   | 4 | 9 | 4 | 10| 2   | 5   |
| 11: | 4 | 4 |   | 9 | 4 | 10| 2   | 5   |

(Equivalence classes:
((a b c d f h j k l m o q r s t u v w x y z -)
(e) (g) (i) (n) (p) (#:φ) (φ: ))

In Table 3, the current states are listed in the column on the left, followed by a ":" for final states and "." for non-final states. The columns are headed by symbol pairs, and the transitions from a given state for a given symbol pair are indicated by the state numbers at the intersection of the symbol column and the state row. For example, Table 3 indicates that state 4 is a final state, and that if the FST reads the symbol pair "i" (i:i), then the current state of the FST should change from state 4 to state 9. The character # is the start of word indicator, so the column #:φ indicates transitions at the start of a word. Because of the :φ, the # in the input string does not carry over into the output string.

Table 3 can be used to determine the action of an FST encoded according to the state-transition diagram shown, since the current state is known and the state which is transitioned to is listed for that current state under the column for the input-output symbol pair. Because of the simplicity of this example, many of the symbol pairs will cause identical behaviors. For example, since the symbol pairs a:a and b:b are not mentioned in the rules, they are not treated any differently, therefore the columns for these two pair will be equivalent. To simplify the display of Table 3, equivalence classes are used. The particular equivalence classes are listed at the bottom of Table 3. The first equivalence class includes all but five letters of the alphabet and is identified by the first letter of the equivalence class—thus the column labelled "a" should be used for determining the transitions associated with any one of the other symbol pairs in the equivalence class listed. Where no transition is allowed from a state for a given symbol pair, that entry in Table 3 is left blank. For example, if the current state is state 5, no transition is allowed for the symbol pair e:e.

Referring again to FIG. 2, directed graph 20 reflects the state-transition diagram of Table 3. As indicated above, the label "a" covers transitions for each symbol pair in the equivalence class "a".

The operation of an FST using directed graph 20 with the input string "dipped" will now be described. The FST starts in state 1, and reads in the first character of the input string, which is the "#" beginning of word marker. The only possible transition for an input symbol "#" is from state 1 to state 2. The output string, if it is being read, is not advanced, and if it is being output by the FST, is contains no symbols, as indicated by the "#:φ" label on the transition from state 1 to state 2.

In state 2, the FST reads the next input symbol, "d" (case insensitivity is assumed in this example, although it is not required). The only possible transition is from state 2 to state 3. Although a transition explicitly labelled "d" is not shown, the transition labelled "a" (from state 1 to state 2) is taken, because "d" is in the equivalence class "a". Reading the second character,"i", the FST takes the transition from state 3 to state 4.

Reading the third character, "p", the FST can the transition from state 4 to state 10, or the transition from state 4 to state 5, which does not "use up" the "p" from the input string, and then to state 6, which uses the "p". Although directed graph 20 is a deterministic FST, two possible paths are available at state 4. To keep track of the different possible paths, the allowed paths will be identified by the states through which they pass. Thus, after reading the third character, the allowed paths for the input string must begin with either 1-2-3-4-10, or 1-2-3-4-5-6.

Reading the fourth character, "p", the 1-2-3-4-5-6 path is blocked, since there is no "p" transition from state 6, thus the 1-2-3-4-10 path is the only viable choice. From state 10, the transition to state 5 is the only allowed transition, followed by a transition to state 6. Up to this point, the only allowed path begins with 1-2-3-4-10-5-6.

The fifth character, "e", is read while the current state is state 6, and the allowed transition is to state 4.

Reading the sixth and final character, "d", the transition from state 4 to itself and the transition to state 5. However, since the transition to state 5 does not use up a character, and a transition from state 5 for "d" does not exist, that path is not allowed. Thus, the only allowed final path for the input string "dipped" is 1-2-3-4-10-5-6-4-4. Since state 4 is a final state, this path is an accepted path in the FST. The output, if not known, can be found by retracing the path and looking at the output symbol portion of each transition label. In this case, the output symbols for the path are as follows (output symbols in parentheses):

1 (0) 2 (d) 3 (i) 4 (p) 10 (–) 5 (p) 6 (e) 4 (d) 4

In other words, the only input-output string pair containing the input string "dipped", is the string pair (dipped, dip-ped).

Of course, if the output string is known in advance, reading a possible output symbol could be an additional requirement of extending the path. For example, the input-output string pair (dipped, dep-ped) should not be accepted by the FST. The non-acceptance of this pair is apparent from FIG. 2, as no path exists for the symbols of this pair, since the FST blocks in state 3, since no transition exists for the symbol pair "i:e", and no alternative paths exist.

Because of the loops in directed graph 20, such as the one from state 4 to states 10, 5, 6, and back to state 4, an infinite number of string pairs will be accepted. For example (dippedped, dip-ped-ped) will clearly be accepted, since the path 1-2-3-4-10-5-6-4-10-5-6-4 is allowed for that string pair, and it ends at a final state.

Many other input strings will be accepted by an FST using directed graph 20, including, for example, the arbitrary input string "clepelings", which illustrates how the strings which can be processed by an FST using directed graph 20 is not limited to predetermined words.

The FST starts in state 1, takes the transition from state 1 to state 2, as in the previous example, and reads in the first character of the input string, "c". Because "c" is in equivalence class "a", the only allowed path is one with the transition labelled "a" from state 2 to state 3. Reading the second character, "l", which is also in equivalence class "a", the only allowed path includes the transition from state 3 to state 4.

Two paths are allowed for the third character, "e". From state 4, a transition to state 4 itself is allowed, and a transition to state 5 is allowed. However, since the input symbol for the path to state 5 is a null, and state 5 does not have a transition for the input symbol "e", this path is blocked, leaving only the path 1-2-3-4-4.

Since the fourth character is "p", two paths are allowed, to state 10 and state 5. The transition to state 5 is followed by a transition to state 6, so the allowed paths begin with either of the partial paths 1-2-3-4-4-10 and 1-2-3-4-4-5-6. Reading the fifth character, "e", the first path allows a transition from state 10 to state 5, which is then blocked, since it has no "e" transition. The second path (1-2-3-4-4-5-6) has an allowed transition from state 6 to state 4, which happens to be its only allowed transition. Thus, to this point the allowed path is 1-2-3-4-4-5-6-4.

Reading the sixth character, "1", the transition must be from state 4 to itself, since the other allowed transition, to state 5, is blocked by lack of an "1" transition. Reading the seventh character, "i", the transition must be from state 4 to state 9, or to state 5 and then to state 7. Thus, the allowed paths to this point are 1-2-3-4-4-5-6-4-4-9, and 1-2-3-4-4-5-6-4-4-5-7.

Reading the eighth character, "n", the first of the above allowed paths requires a transition from state 9 to state 11 or to state 5 (which is blocked), and the second allowed path requires a transition from state 7 to state 8.

Reading the ninth character, "g", the first path (1-2-3-4-4-5-6-4-4-9-11 fails because state 11 has no "g" transition, leaving only the path up to state 8, and a transition from there to state 4. At this point, the allowed path is 1-2-3-4-4-5-6-4-4-5-7-8-4.

Reading the tenth character, "s", the only allowed transition is from state 4 to state 4, since the transition to state 5 and out of state 5 is blocked. Thus, the final path for the input string is 1-2-3-4-4-5-6-4-4-5-7-8-4-4.

Since state 4 is a final state, the input string is an input string of an allowed string pair. In other words, the hyphenation FST recognizes the string as something it can process. The output string for this allowed path is easily determined to be "cle-pel-ings", which is hyphenated properly according to both Rules 1 and 2.

FIG. 3 is a block diagram of one embodiment of a finite state transducer (FST) system 30 according to the present invention which uses directed graph 20 in processing string pairs. FST system 30 comprises input buffer 32a, input buffer 32b, FST 34, and output buffer 36. FST 34 comprises a central processing unit 38, and a memory 40. Memory 40 comprises a current state storage location 42 and a state-transition data structure 44.

Input buffers 32a, 32b are coupled to inputs of CPU 38 and supply an input string and an output string, respectively, to CPU 38. Output buffer 36 is coupled to an output of CPU 38. A data bus also couples current state storage location 42 and state-transition data structure 44 to CPU 38. In some embodiments, hyphenation FST system 30 comprises a means for generating contents of input buffer 32a from the contents of input buffer 32b, by removing all non-required hyphens from a string input to input buffer 32b and inserting the modified string into input buffer 32a.

When FST 34 operates, it reads an input tape which is stored in input buffer 32a, and an output tape which is stored in output buffer 32b. The current state is indicated by a value stored in current state storage location 42, and CPU 38 reads the state-transition data in data structure 44 to determine new states. If FST 34 is a non-deterministic FST, storage location 42 might have space allocated for more than one current state, to account for any multiple paths being investigated. An example of the state-transition data is the data shown in Table 3. After reading the input and output tapes, FST 34 outputs a validity bit indicating whether or not the current state at the end of reading the tapes is a final state or not, thus indicating whether the input-output string pair was accepted by FST 34.

As should be apparent from FIG. 3, FST 34 can be programmed for a different set of rules than those of FIG. 3, by using a different data structure 44 which encodes for such rules.

Figure 4:
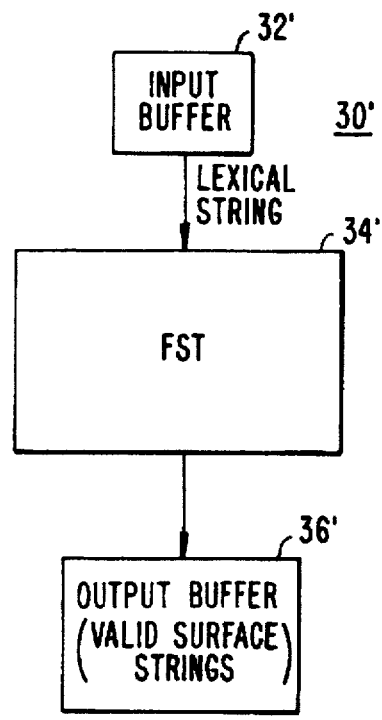
FIG. 4 is a block diagram of a string processor which processes input strings according to the directed graph of FIG. 2 to generate a word with hyphenation positions indicated.

FIG. 4 is a block diagram of another embodiment of an FST system 30' according to the present invention. FST system 30' comprises an input buffer 32', similar to input buffer 32a, an FST 34', similar to FST 34, and an output buffer 36'. FST 34' is coupled to receive an input string from input buffer 32', and to output an output string to output buffer 36'.

The operation of FST 34' is similar to that of FST 34, except that FST 34' does not limit its search for acceptable paths by reference to output symbols. Instead, if a valid path is found for the input string input from input buffer 32', then the output string associated with that path is output to output puffer 36'. If the FST is programmed to allow multiple output strings for a given input string, output buffer 36' will have the capacity for multiple output strings.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An apparatus for determining hyphenation positions in an input string, comprising:

input means for reading input symbols from the input string;

a finite state machine coupled to said input means, said finite state machine characterized by an initial state, a current state, and a state-transition data structure, wherein said current state is determined by at least one input symbol in the input string and by transitions in said state-transition data structure, where said state-transition data structure encodes for a single level of hyphenation rules, wherein each hyphenation rule of said single level of hyphenation rules: is a rule defining a pattern and, with respect to said pattern, defines at least one allowed hyphen position or at least one allowed hyphen position and at least one prohibited hyphen position; and hyphenation indication means coupled to said finite state machine, for indicating hyphenation positions in the input string, said hyphenation positions controlled by said patterns defined by said single level of hyphenation rules encoded by said state-transition data structure.

2. The apparatus of claim 1, wherein said single level of hyphenation rules comprises at least one rule applicable to an infinite number of strings.

3. The apparatus of claim 2, wherein said single level of hyphenation rules further comprises at least one rule applicable to a finite number of strings not covered by other rules.

4. The apparatus of claim 2, wherein said single level of hyphenation rules further comprises at least one rule applicable to a finite number of strings not covered by other rules, and wherein a negation rule is added to said other rules such that said other rules including said negation rules do not cover the hyphenation of said finite number of strings.

5. The apparatus of claim 1, wherein the input string is a word in a language.

6. The apparatus of claim 5, wherein said language is English.

7. The apparatus of claim 5, wherein said language is Finnish.

8. The apparatus of claim 1, wherein the input string is a word in a document used by a word processing program, and said hyphenation indication means is coupled to a line break position decision processor in said word processing program.

9. The apparatus of claim 1, wherein said hyphenation indication means outputs a string containing symbols from the input string interspersed with hyphens in hyphenation positions.

10. The apparatus of claim 1, wherein the input string includes at least one hyphen in at least one proposed hyphenation position, and wherein said hyphenation indication means indicates whether said proposed hyphenation position is in accordance with said single level of hyphenation rules.

11. The apparatus of claim 1, wherein said state-transition data structure is a data structure generated by automatic compilation of said single level of hyphenation rules into said data structure.

12. The apparatus of claim 1, wherein said state-transition data structure is a data structure generated by manual compilation of said single level of hyphenation rules into said data structure.

13. A method of hyphenating an input string, comprising the steps of:

compiling a single level of hyphenation rules into a state-transition structure, wherein each hyphenation rule of said single level of hyphenation rules encodes hyphenation positions for patterns associated with said each hyphenation rule, said hyphenation rule indicating at least one of an allowed hyphen position or an allowed hyphen position and a prohibited hyphen position in its pattern, at least one of said single level of hyphenation rules encoding at least one hyphen position for a pattern which maps to an unbounded set of input strings;

programming a finite state machine according to said state-transition structure;

resetting said finite state machine to an initial state;

modifying at least one current state of said finite state machine according to symbols in the input string and according to said state-transition structure; and outputting a hyphen position indicator according to transitions from one state to another state occurring in said modifying step.

14. The method of claim 13, wherein said step of outputting a hyphen position indicator further comprises outputting said symbols in the input string interspersed with hyphens in hyphen positions.

15. The method of claim 13, wherein the input string comprises at least one hyphen in a proposed hyphen position, and said step of outputting a hyphen position indicator further comprises the step of outputting a correspondence indicator which indicates either that said proposed hyphen position corresponds to a hyphen position for the input string or that said proposed hyphen position does not correspond to said hyphen position for the input string.

16. A method of generating a finite state machine comprising the steps of:

creating a single level of hyphenation rules, at least one rule of said single level of hyphenation rules encoding at least one hyphen position for a pattern which maps to an unbounded set of input strings, wherein each hyphenation rule of said single level of hyphenation rules defines valid output strings for a set of possible input strings operated upon by said each hyphenation rule;

generating a state-transition structure corresponding to said patterns from said single level of hyphenation rules, said state-transition structure comprising data indicating which of a plurality of transitions from a current state to a next state is taken following an input of a particular symbol in an input string, said data also indicating hyphen positions in said input string; and coupling a finite state processor to said state-transition structure, thereby forming a finite state machine which outputs only an output string selected from said valid output strings when an input string is a string in said set of possible input strings.

17. A method of hyphenating an input string selected from a set of input strings, wherein a string is an ordered array of symbols and the set of input strings is unbounded in that the set includes more input strings than is feasibly possible to enumerate onto a predetermined fixed list of input strings, the method comprising the steps of:

identifying a single level of hyphenation rules, wherein a hyphenation rule of the single level of hyphenation rules indicates at least one allowed hyphen position or at least one allowed hyphen position and at least one prohibited hyphen position for a pattern of symbols associated with the hyphenation rule;

compiling the single level of hyphenation rules into a state-transition structure;

programming a finite state machine according to the state-transition structure;

resetting the finite state machine to an initial state;

setting a symbol pointer to a current symbol in the input string;

modifying the current state of the finite state machine according to either a matching transition or a null transition, where a matching transition is a transition with an input symbol equal to the current symbol in the input string and a null transition is a transition with an input symbol equal to a null symbol, thereby effecting a mapping of patterns of symbols in the hyphenation rules to symbols in the input string;

incrementing the current symbol pointer when a matching transition is taken;

repeating the steps of modifying and incrementing until a terminal state is reached; and outputting at least one hyphen position indicator according to transitions taken in the modifying step.

18. The method of claim 17, further comprising a step of decrementing the current symbol pointer when a state is reached which has no valid transition for the current input symbol or when the finite state machine is in a non-final state following a transition taken for a terminal symbol of the input string.

19. The method of claim 17, wherein the single level of hyphenation rules is compiled into a state-transition structure include a plurality of rules indicating allowed hyphenation positions and a plurality of rules indicating prohibited hyphenation positions.

* * * * *